UNITED STATES PATENT OFFICE 2,003,860

BITUMINOUS EMULSION

Kenneth E. McConnaughay, Indianapolis, Ind., assignor to Pre Cote Corporation, Indianapolis, Ind., a corporation of Indiana No Drawing. Application March 9, 1931, Serial No. 521,390

1 Claim. (Cl. 134—1)

In the production of bituminous emulsions, it is customary to melt the bitumen and add it to water, the mixture being thoroughly agitated to effect emulsification. This process is satisfactory when the melting point of the bitumen used is such that the water, upon the addition of the bitumen to it, will not be heated above the boiling point. The harder grades of asphalt and other bitumens have melting points so high that if introduced in melted condition into water in the proportion usually desired they will cause the water to boil and will thereby make emulsification impossible. Because of this, when the bitumen is emulsified by the process above described, there is in practice a maximum limit to the hardness of the bitumen in the product which results when the emulsion breaks.

It is the object of my invention to produce an emulsion of bitumen and water particularly suitable for, although not limited to, use in the laying of pavements which comprise a mixture of bitumen and aggregate. More specifically, it is my object to produce a bituminous emulsion which, after it breaks, will leave a composition materially harder than can be produced by any prior emulsion of which I have knowledge. A further object of my invention is to produce an emulsion in which the proportion of emulsifying agents that have a deleterious effect upon the bitumen is materially less than in any prior bituminous emulsion of which I am aware.

In carrying out my invention I incorporate in the emulsion two different grades of asphalt, one of which is comparatively soft and the other of which is extremely hard. The hard asphalt is reduced to powdered form and in that state is incorporated in the emulsion. I find that the use of this powdered hard asphalt permits the production of an emulsion which, after it breaks, will result in a finished composition having a hardness materially greater than can be obtained with other emulsions; and I also find that the use of powdered bitumen permits a decrease in the portion of emulsifying agents necessary to secure an emulsion of the desired stability.

An emulsion embodying my invention may have the following composition:

|  | Parts by weight |
|---|---|
| Asphalt (110 penetration) | 100 |
| Asphalt (3 penetration) | 7 |
| Water (preferably soft) | 100 |
| Red oil (commercial oleic acid) | 0.7 |
| Sodium hydroxide | 0.1 |

In making an emulsion of the above ingredients, the soft asphalt is melted by heating it to a temperature of approximately 315° F. and the red oil is mixed with it. The hard asphalt, in finely divided state, and the sodium hydroxide are added to the water, which previously has been heated to approximately 115° F. The mixture of hard asphalt, water, and sodium hydroxide is vigorously stirred or otherwise agitated, until the powdered asphalt has become suspended, and the mixture of soft asphalt and red oil is then introduced, the stirring or other agitation being continued. The mixing of the ingredients can conveniently be carried out in the emulsifying apparatus of my prior Patent 1,941,808. The resulting emulsion will have a temperature of approximately 180 to 200° F., will remain stable for a period of days, and is smooth and homogeneous. Because of the small proportion of sodium oleate (formed by the reaction of the red oil and sodium hydroxide) the asphalt is not deleteriously affected. The emulsion adheres well to aggregate, and is well suited to use in the preparation of paving material as by the immersion process set forth in my prior Patents Nos. 1,945,058 and 1,975,902.

The ingredients and their proportions are susceptible of considerable modification. In most instance, approximately equal proportions of water and soft asphalt will be used, and in practically all cases the water content of the emulsion will lie between 40% and 60%. In certain extreme instances, it may be desirable to use as little as 30% water or as much as 70%. The hardness of the asphalt or other bitumen employed will of course depend upon the hardness desired for the finished material. The hardness of the finished material will depend upon the proportions of hard and soft asphalt used and upon their respective degrees of hardness. The hard asphalt used in my process, of course, must have a hardness sufficient so that it can be ground and will remain a powder at all ordinary temperatures. Particles of the hard asphalt should preferably have such a size that at least 75% of the hard asphalt will pass through a 200 mesh screen. As substitutes for the hard asphalt, Gilsonite, hard pitch, other hard bitumens, or ground hard rubber can be used.

As indicated above, the oleic acid and sodium hydroxide react to form sodium oleate which acts as an emulsifying agent which facilitates the formation of the emulsion and increases its stability. Other soaps or emulsifying agents can be used as substitutes for the sodium oleate.

By my invention it is possible to create from an emulsion a finished material which will not re-emulsify and which will have a hardness greater than can be obtained by other emulsions of which I am aware. The hardness of the finished material is intermediate between that of the two grades of asphalt used in the emulsion, and can be increased by increasing the proportion of hard asphalt which the emulsion contains as well as by increasing the hardness of the soft asphalt forming the bulk of the bitumen-content of the emulsion. If extremely hard finished material is desired, as much as 20% (based on the amount of soft bitumen) of the finely divided hard asphalt can be used in the emulsion.

I claim as my invention:

The process of making a bituminous emulsion containing bitumen of two different degrees of hardness, which comprises suspending the harder bitumen in powdered form in a water solution of an alkali, melting the softer bitumen, adding saponifiable material to the softer bitumen, and then thoroughly mixing the melted softer bitumen and the saponifiable material with the alkaline solution in which the harder bitumen has been suspended.

KENNETH E. McCONNAUGHAY.